Figure 1:
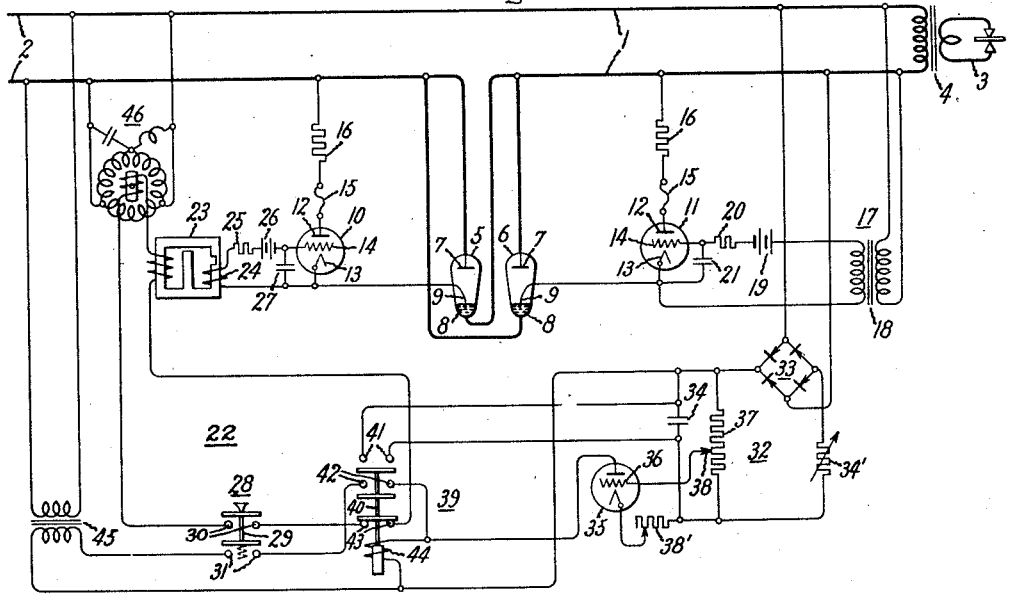

Oct. 31, 1944.   W. C. HUTCHINS   2,361,845
ELECTRIC VALVE CIRCUIT
Filed May 7, 1938

Inventor:
Warren C. Hutchins,
by Harry E. Dunham
His Attorney.

Patented Oct. 31, 1944

2,361,845

UNITED STATES PATENT OFFICE 2,361,845

ELECTRIC VALVE CIRCUIT

Warren C. Hutchins, Schenectady, N. Y., assignor to General Electric Company, a corporation of New York Application May 7, 1938, Serial No. 206,618

17 Claims. (Cl. 250—27)

My invention relates to electric valve circuits, and more particularly to electric valve circuits for obtaining energization of a load circuit for a predetermined interval of time.

In many types of electric valve translating circuits, it is desirable to control the electric valve apparatus to effect energization of a load circuit from an alternating current supply circuit during an accurately determinable interval of time. For example, in electric valve circuits for energizing welding circuits for spot welding operation, it is desirable to determine accurately the interval of time during which energy is transmitted to the welding circuit. Furthermore, because of the transient currents which may be established due to the sudden application of voltage to a circuit of this nature, there is likelihood of establishing transient currents of sufficient magnitude to injure the electric valve apparatus. The transient currents cause dissimilar welds and are for this reason objectionable. Of course, the large transient currents established by the application of the supply voltage to the load circuit may be reduced or substantially eliminated by controlling the time during the cycle of supply voltage at which the energization of the load circuit is initiated. The prior art arrangements have used various devices and circuits for effecting initiation of the energization of the load circuit at a definite time during cycles of voltage of the source. Some of the prior art arrangements have used complicated electric valve circuits involving the use of expensive apparatus to obtain the desired synchronous operation. Other of the prior art arrangements have utilized mechanical and electro-mechanical synchronizing devices which do not possess the simplicity of structure and operation or low cost and infrequent inspection and repair as is desirable. In accordance with the teachings of my invention described hereinafter, I provide a new and improved electric valve circuit which is relatively simple in structure and arrangement and inexpensive and which overcomes many of the disadvantages of the prior art arrangements. The energization of the load circuit is initiated at a predetermined time during the cycles of voltage of the alternating current source to eliminate or reduce the transient starting currents, and the period of energization of the load circuit is accurately determinable.

It is an object of my invention to provide a new and improved electric valve circuit.

It is another object of my invention to provide a new and improved control system for electric valve translating apparatus.

It is a further object of my invention to provide a new and improved electric valve translating circuit for effecting energization of a load circuit during an accurately determinable interval of time.

It is a still further object of my invention to provide a new and improved electric valve translating circuit for effecting energization of a load circuit during an accurately determinable interval of time, and which initiates the period of energization at a time in synchronism with the voltage of the alternating current circuit irrespective of the time of operation of a manually operable control device.

In accordance with the illustrated embodiments of my invention, I provide a new and improved electric valve translating circuit for energizing a load circuit, such as a welding circuit, from an alternating current supply circuit during an accurately determinable interval of time. To eliminate or reduce the large transient currents during the starting operation, or, in other words, during the time immediately following the connection of the supply circuit to the load circuit, I provide a control circuit including means, such as a saturable transformer, for producing a voltage of peaked wave form which is impressed on the control member of an electric valve in the control system. Because of the peaked wave form of the control voltage, the electric valve will be rendered conductive at a predetermined time during half cycles of voltage of one polarity of the alternating current circuit, so that the time of initiation of the periods of energization of the load circuit always corresponds to the power factor angle of the load circuit. To control the period of energization of the load circuit, I provide a timing circuit which is energized from the load circuit and which renders the control circuit ineffective after the expiration of a predetermined even number of half cycles of voltage impressed upon the load circuit. The closure of the control circuit to initiate the energization of the load circuit is effected by means of a suitable switching means such as a manually operable switch. However, due to the voltage of peaked wave form, the initiation of the periods of energization will be effected only at definite times during half cycles of voltage of the supply circuit, thereby assuring a precise time relation between the voltage of the alternating current supply circuit and the time of initiation of the energization of the load circuit. As a consequence, the transient starting current is prevented.

Another important feature of the electric valve circuit is the arrangement including the timing circuit which controls the period of energization of the load circuit to assure the transmission of a predetermined amount of energy to the load circuit during energization thereof. For example, the timing circuit controls the length of the period of energization to compensate for substantial variations in the magnitude of the voltage of the supply circuit.

Figure 2:
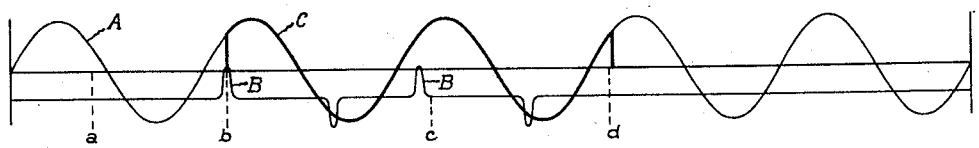
Figure 3:
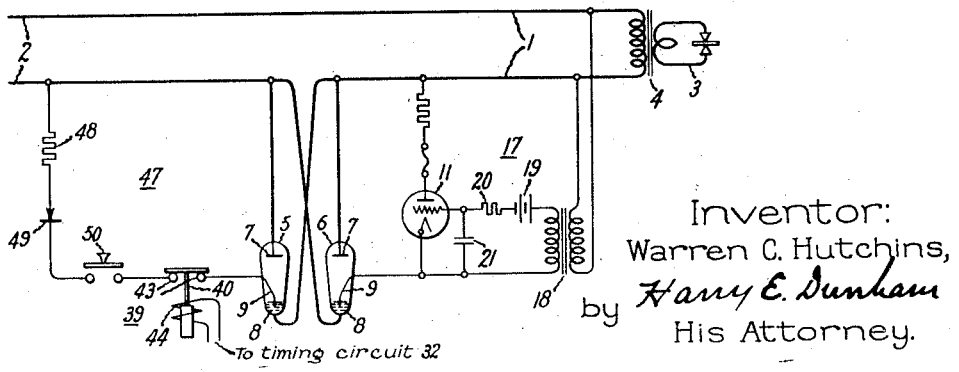

For a better understanding of my invention, reference may be had to the following description, taken in connection with the accompanying drawing, and its scope will be pointed out in the appended claims. Fig. 1 of the drawing diagrammatically illustrates an embodiment of my invention as applied to an electric welding system; Fig. 2 represents certain operating characteristics thereof, and Fig. 3 represents another modification of my invention employing an improved control circuit.

Referring now to Fig. 1, I have diagrammatically illustrated my invention as applied to an electric valve translating circuit for energizing a load circuit 1 from an alternating current supply circuit 2. The load circuit 1 may be employed to energize a welding circuit 3 through a transformer 4. Connected between the alternating current supply circuit 2 and the load circuit 1, I provide a pair of reversely connected electric valve means 5 and 6 which are arranged to transmit an even number of half cycles of alternating current to the load circuit 1. The electric valve means 5 and 6 are preferably of the type employing an ionizable medium and each includes an anode 7, a cathode 8 of the self-reconstructing type, such as a mercury pool cathode 8, and may include an associated immersion-igniter control member 9 having an extremity thereof extending below the surface of the mercury pool cathode. The immersion-igniter control members 9 are preferably constructed of a material, commonly referred to as semi-conducting material, such as silicon-carbide or boron-carbide. Arc discharges are initiated between the anodes 7 and the cathodes 8 when sufficient current is transmitted through the immersion-ignited control members 9.

To energize the control members 9 of electric valves 5 and 6, I provide control electric valves 10 and 11, respectively. The electric valves 10 and 11 are preferably of the type employing an ionizable medium and each includes an anode 12, a cathode 13 and a control grid 14. The control electric valves 10 and 11 are energized in accordance with the anode-cathode voltage of the associated main electric valves 5 and 6 through a protective means, such as a fuse 15 and a current limiting resistance 16.

Electric valves 5 and 6 are arranged so that the electric valve 6 follows the electric valve 5; that is, electric valve 6 is rendered conductive only during half cycles immediately following half cycles of conduction of the leading electric valve 5. To effect this type of control, the control grid 14 of electric valve 11 is energized through a circuit 17 which in turn is energized from the load circuit 1. The electric circuit 17 includes a transformer 18 which is connected to the load circuit 1, a suitable source of negative unidirectional biasing potential such as a battery 19, a current limiting resistance 20 connected in series relation with the control grid 14, and a capacitance 21 which is connected across the grid 14 and the cathode 13. While I have shown an electric valve circuit including a pair of reversely connected electric valves in which one of the electric valves is arranged to follow the other electric valve, it is to be noted that I may employ an arrangement in which the electric valves are controlled independently, that is, in which separate control circuits are associated with each of the electric valves and whereby the period of energization of the load circuit may be initiated by rendering either of the valves first conductive.

As a means for effecting energization of the load circuit 1 during an accurately determinable interval of time corresponding to an even number of half cycles of current and as a means for initiating the periods of energization at predetermined times during the half cycles of voltage of the alternating current circuit 2, I provide a control circuit 22. The control circuit 22 may comprise a suitable means for producing a periodic voltage of peaked wave form, such as a saturable transformer 23. Secondary winding 24 of transformer 23 is connected to the control grid 14 of electric valve 10 through a current limiting resistance 25 and a source of negative unidirectional biasing potential such as a battery 26. A capacitance 27 may be connected across the cathode 13 and the control grid 14 to absorb extraneous transient voltages which may be present in the control circuit.

Although I have diagrammatically illustrated the control circuit 22 as comprising a particular means, such as a saturable transformer 23 for producing a voltage of peaked wave form, it is to be understood that I may employ any other suitable arrangement well known in the art for rendering the control electric valve 10 conductive at a predetermined time during the cycles of voltage of the alternating current circuit 2. For example, I may employ such means as capacitance discharge circuits, or circuits including sources of alternating voltage and sources of unidirectional voltage, either or both of which may be periodically applied to produce voltages of peaked wave form or voltages of perpendicular wave front.

As a means for initiating the periods of energization of the load circuit 1 by connecting the transformer 23 in operative relation with respect to the control grid 14 of the electric valve 10, I provide a circuit controlling device, such as a switch 28, which may be of the manually operable type. Of course, it is to be understood that the switch 28 may be of the type which is automatically operated if the conditions to be met warrant apparatus of that nature. However, due to the nature of the control circuit 22, the switch 28 may be closed at random and the electric valve 10 will be rendered conductive at a precise time during the cycle of alternating voltage irrespective of the time of such closure. The switch 28 includes a movable member 29 and sets of cooperating stationary contacts 30 and 31.

I provide a timing means, such as a timing circuit 32, which is energized from the load circuit 1 to render the control circuit 22 inoperative after the expiration of a predetermined number of half cycles of energization of the load circuit 1, even though the switch 28 is maintained in the closed position for a longer period of time. The timing circuit 32 controls the number of consecutive impulses of voltage of peaked wave form which are impressed on the control member 14 of the control electric valve 10 and hence controls the number of consecutive half cycles or cycles of current which are transmitted to the load circuit 1. The timing circuit 32 may include a rectifier 33 which may be of the full-wave type which charges a capacitance 34. The voltage appearing across the capacitance 34 serves as an indication of the length of the period of energization of the load circuit 1 and is utilized to operate an electric valve 35. An adjustable resistance 34' is connected in series relation with the rectifier 33 and the capacitance 34 to control the rate at which the capacitance 34 is charged and hence to control the duration of the period of energization of and the amount of energy transmitted to the load circuit 1. The electric valve 35 is preferably of the type employing an ionizable medium and is provided with a control grid 36. As a means for energizing the control grid 36 to render the electric valve 35 conductive at a predetermined value of voltage appearing across capacitance 34, I provide a voltage divider including a resistance 37 and an adjustable contact 38. An adjustable resistance 38' is connected in series relation with electric valve 35 to control the rate of discharge of capacitance 34.

The timing circuit 32 also functions to control the period of energization of the load circuit 1 to compensate for substantial variations in the magnitude of the voltage of circuit 2, thereby assuring the transmission of a predetermined amount of energy to the load circuit 1 during each energization of the load circuit.

To render the control circuit 22 inoperative after the expiration of the predetermined desired interval of energization of the load circuit 1, I provide a suitable controlling means, which may be a contactor mechanism 39. The mechanism 39 may be of the electromagnetic type having an armature 40 and sets of stationary contacts 41, 42 and 43. The contactor mechanism 39 is provided with an actuating coil 44 which when energized raises the armature member 40. The actuating coil 44 is energized from the capacitance 34 through electric valve 35 when the voltage of the capacitance 34 attains a predetermined value, or, in other words, at the expiration of the desired interval of energization of the load circuit 1. Contacts 41 are connected across the terminals of the capacitance 34 and serve to short-circuit the capacitance 34 after the armature member 40 has been moved to the upper position. Contacts 43 are connected in series relation with contacts 30 of switch 28 and the primary winding of transformer 23. Contacts 42 are connected in series relation with contacts 31 of switch 28 and serve to complete a holding circuit for the actuating coil 44 so long as the switch 28 is maintained in the closed position. As a means for supplying holding current to the actuating coil 44 after the armature 40 has been moved to the upper position, I provide a transformer 45 which may be energized from any suitable source of current such as the alternating current circuit 2.

In order to control the phase of the voltage of peaked wave form impressed on the control grid 14 of the electric valve 10, I employ any suitable phase shifting arrangement, such as a rotary phase shifter 46. The rotary phase shifter 46 serves to control the time during the positive half cycles of voltage of circuit 2 at which the electric valve 10 is rendered conductive and hence serves to control the amount of energy transmitted to the load circuit 1 during the periods of energization thereof.

The operation of the embodiment of my invention shown in Fig. 1 will be explained by considering the system when it is desired to effect energization of the load circuit 1, and hence energization of the welding circuit 3, during an accurately determinable interval of time. As is well understood by those skilled in the art, the electric valves 5 and 6, after the initiation of the arc discharges by the proper energization of the control members 9, conduct current until the potentials of the anodes 7 are sufficiently reduced. That is, after the arc discharges have been initiated, the control members are generally ineffective to render the electric valve means nonconductive. Due to the fact that in the particular arrangement shown the electric valve 6 is connected to follow the electric valve 5, the load circuit 1 will be energized for an even number of half cycles of voltage of the circuit 2. The average current transmitted to the load circuit 1, and hence the energy transmitted thereto, is increased as the electric valves 5 and 6 are rendered conductive at earlier points in the positive half cycles of applied anode-cathode voltage, and is decreased as the electric valves are rendered conductive at later points in the positive half cycles of applied anode-cathode voltage.

When the electric valves 10 and 11 are rendered conductive, unidirectional current is transmitted to the control members 9 of electric valves 5 and 6, respectively, to render electric valves 5 and 6 conductive alternately. The unidirectional current for the control members 9 is derived from the anode-cathode circuits of the electric valves 5 and 6. When the switch 28 is moved to the closed circuit position, the control circuit 22 and the transformer 23 are operatively connected to the control grid 14 of the control electric valve 10 and renders the electric valve 10 conductive at the desired time during the first positive half cycle of voltage of the supply circuit 2. The primary winding of transformer 23 is energized through a circuit including the secondary winding of the phase shifter 46, contacts 43 of the contactor mechanism 39, and contacts 30 of switch 28. Electric valve 5 is rendered conductive due to the unidirectional current transmitted to the control members 9, and the electric valve 6 is rendered conductive during the immediately succeeding half cycle of voltage of circuit 2 by means of the control electric valve 11 which is rendered conductive by the voltage derived from the load circuit 1 through transformer 18. The number of half cycles of current transmitted to the load circuit 1 is dependent upon the setting of the timing circuit 32. At the expiration of the desired interval of energization of load circuit 1, the capacitance 34 is discharged through the actuating coil 44 of the contactor mechanism 39 and electric valve 35 to raise the armature 40 to the upper position. When the armature 40 is in the upper position, the capacitance 34 is short circuited and control circuit 22 is opened to render the circuit 22 inoperative until the switch 28 is moved to the open circuit position thereby resetting the mechanism 39. The armature member 40 of the contactor mechanism 39 is maintained in the upper position; that is, it is locked in the upper position by the current derived from transformer 45 which supplies current to the actuating coil 44 so long as the switch 28 is maintained in the closed position. By releasing the movable member 29 of switch 28 so that the switch is in the open position, the circuit is automatically reset to place the system in condition for another energization of the load circuit 1. When the switch 28 is released, the holding circuit for actuating coil 44 is opened permiting the armature member 40 to return to the position shown in the drawing.

A better understanding of the manner in which the control system effects energization of the load circuit 1 and in which the control circuit initiates the energization at the desired times during half cycles of voltage of circuit 2, may be had by referring to the operating characteristics shown in Fig. 2. Curve A represents the voltage of the alternating current circuit 2 and hence may be employed to illustrate the anode-cathode voltage of one of the main or power electric valves as, for example, the anode-cathode voltage of electric valve 5. Curve B represents the voltage of peaked wave form produced by the saturable transformer 23, when control circuit 22 is closed, and which is impressed on the grid 14 of electric valve 10. The heavy curve C represents the voltage impressed on the load circuit 1. Let it be assumed that it is desired to effect energization of the load circuit 1 during two cycles of voltage of circuit 2. This period of energization is effected by positioning the contactor 38 of the voltage divider of circuit 32. If it be assumed that the switch 28 is closed at time $a$, the electric valve 10 and hence the associated main electric valve 5 will not be rendered conductive until time $b$, at which time the period of energization of the load circuit 1 is initiated at the desired instant. The positive half cycles of current will be transmitted to the load circuit by electric valve 5 and the negative half cycles will be transmitted by the electric valve 6 which follows electric valve 5. It will be noted that the time of initiation of the period of energization is always maintained in a definite synchronous relation with respect to the voltage of the supply circuit 2. Furthermore, it is to be noted that the circuit is susceptible of effecting precise control of the length of the periods of energization since the circuit permits a reasonable latitude or variance in the timing operation of circuit 32 and contactor 39. For example, precise control of the length of the periods of energization is obtained even though the timing circuit 32 varies through an interval $c$—$d$. Even though the timing circuit 32 would operate the contactor mechanism 39 to open control circuit 22 at time $c$, the load circuit 1 will be energized during the exact interval desired; that is, the load circuit 1 will be energized during the interval $b$—$d$. In this manner the precision of operation of timing circuit 32 need not be as great as the precision of operation required of the system as a whole. In one sense, synchronous operation of the system is obtained by using an asynchronous timing circuit which is energized from the load circuit.

The timing circuit 32 also serves an additional function of assuring that a predetermined amount of energy is transmitted to the load circuit 1 in response to a single closure of the switch 28 to compensate for variations in the magnitude of the voltage of circuit 2. Of course, this compensation occurs when there is substantial variation in the magnitude of the voltage of circuit 2. For example, if the voltage of circuit 2 substantially decreases, the timing circuit 32 maintains the system in operation for an extended period of time to transmit the predetermined desired amount of energy to the welding circuit 3.

The reason for this extended period of energization is that the capacitance 34 is charged at a slower rate as the voltage of the supply circuit 2 decreases.

Fig. 3 diagrammatically illustrates another modification of my invention which is similar in many respects to the arrangement shown in Fig. 1 and corresponding elements have been assigned like reference numerals. In the arrangement of Fig. 3, a simplified control circuit is associated with the electric valve 5 which permits elimination of one of the control electric valves. Control circuit 47 conducts current from the anode-cathode circuit of the electric valve 5 to the immersion-igniter control member 9 thereof. The circuit may include a resistance 48, a suitable unidirectional conducting device 49 where it is desired to transmit only unidirectional current to the immersion-igniter control member, and a switch 50 which is connected in series relation with the other elements of the circuit. The contactor mechanism 39 is also connected in circuit 47 and the actuating coil 44 thereof is energized from the timing circuit 32. Where alternating current is not objectionable in the energization of the control member 9, the unidirectional conducting device 49 may be eliminated.

The operation of the embodiment of my invention shown in Fig. 3 is substantially the same as that explained above in connection with Fig. 1. Upon random closing of the switch 50, the period of energization of the load circuit 1 will be initiated at a precise time during the half cycle of applied anode-cathode voltage of the electric valve means 5 due to the fact that the anode-cathode voltage must rise to a value sufficient to transmit a predetermined current through the control member 9; the value of current, of course, is that value which produces a cathode spot on the mercury pool cathode 8 and hence renders the electric valve 5 conductive. The period of energization of the load circuit 1 is controlled by the timing circuit 32. The timing circuit 32 also controls the effective period of operation of the control circuit 47 and compensates for voltage variations of the supply circuit 2. It will be observed that this arrangement for rendering the electric valve means 5 conductive at a predetermined time after the zero point of the positive half cycle of applied anode-cathode voltage tends to render the electric valve conductive at a time which reduces the transient starting current.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a load circuit, electric translating apparatus connected therebetween for controlling the transfer of energy between said circuits and comprising electric valve means, said electric valve means having a control member for controlling the conductivity thereof, and a control circuit for energizing said control member to effect energization of said load circuit for a predetermined interval of time and comprising means for impressing on said control member a periodic voltage to render said electric valve means conductive at a predetermined time during each cycle of voltage of said alternating current circuit during a predetermined number of consecutive half cycles of voltage of said alternating current circuit and means energized from said load circuit for rendering said control circuit inoperative after transfer of said number of consecutive half cycles of current to said load circuit.

2. In combination, an alternating current circuit, a load circuit, electric translating apparatus connected between said circuits and comprising an electric valve means for controlling the transfer of energy between said circuits, said electric valve means including a control member for controlling the conductivity thereof, means for impressing on said control member impulses of voltage of peaked wave form having a predetermined phase relation with respect to the voltage of said alternating current circuit, and independent timing means energized from said load circuit for selectively disconnecting and connecting said last mentioned means in operative relation with said control member thereby determining the number of consecutive impulses of voltage of peaked wave form which are impressed on said control member to render said electric valve means conductive at a predetermined time during half cycles of voltage of said alternating current circuit.

3. In combination, an alternating current circuit, a load circuit, electric translating apparatus connected between said circuits and comprising an electric valve means for controlling the transfer of energy therebetween, said electric valve means including a control member for controlling the conductivity thereof, a control circuit for producing a periodic voltage, switching means for connecting said control circuit in operative relation with respect to said control member, and means energized from said load circuit for permitting energization of said control circuit for a predetermined consecutive number of half cycles of voltage of said alternating current circuit, said periodic voltage serving to render said electric valve means conductive at a predetermined time during the first half cycle of said number irrespective of the time of closure of said switching means.

4. In combination, an alternating current circuit, a load circuit, electric translating apparatus connected between said circuits and comprising electric valve means for controlling the transfer of energy therebetween said electric valve means including a control member for controlling the conductivity thereof, a control circuit comprising means for producing a periodic voltage and means for connecting said means in operative relation with said control member to render said electric valve means conductive at a predetermined time during cycles of voltage of said alternating current circuit, means for controlling the phase of said periodic voltage relative to the voltage of said alternating current circuit to control the amount of power transmitted to said load circuit, and means energized from said load circuit for rendering said control circuit inoperative after a predetermined consecutive number of cycles of voltage of said alternating current circuit.

5. In combination, an alternating current circuit, a load circuit, electric translating apparatus connected between said circuits and comprising electric valve means for controlling the transfer of energy therebetween, said electric valve means including a control member for controlling the conductivity thereof, a control circuit comprising means for producing a periodic voltage and means for connecting said means to said control member to render said electric valve means conductive at a predetermined time during cycles of voltage of said alternating current circuit, and means for effecting energization of said load circuit for a predetermined interval of time and comprising a timing circuit energized from said load circuit and an electromagnetic switching device energized from said timing circuit to render said control circuit inoperative after the expiration of said interval of time.

6. In combination, an alternating current circuit, a load circuit, electric translating apparatus connected between said circuits and comprising a pair of reversely connected main electric valve means for transmitting energy between said circuits, a pair of control electric valves each associated with a control member of a different one of said main electric valves for effecting energization thereof and each comprising a grid for controlling the conductivity thereof, a control circuit comprising means for producing a periodic voltage of peaked wave form, means for rendering said means operative with respect to the grid of one of said control electric valves to render the associated main electric valve means conductive at a predetermined time during half cycles of voltage of said alternating current circuit, means responsive to the energization of said load circuit for rendering the other of said control electric valves conductive, and means responsive to the energization of said load circuit for rendering said control circuit inoperative after a predetermined number of cycles of voltage of said alternating current circuit.

7. In combination, an alternating current circuit, a load circuit, electric translating apparatus connecting said circuits and comprising a pair of reversely connected electric valve means for transmitting energy between said circuits, each of said electric valve means being provided with a control member, a control circuit associated with one of said electric valve means and comprising means for producing a periodic voltage to render said electric valve means conductive at a predetermined time during positive half cycles of applied anode-cathode voltage, means responsive to the current conducted by said one electric valve means for rendering the other electric valve means conductive, and timing means energized from said load circuit for controlling the operative period of said control circuit.

8. In combination, an alternating current circuit, a load circuit, electric translating apparatus connecting said circuits and comprising a pair of reversely connected electric valve means for transmitting energy between said circuits, each of said electric valve means being provided with a control member, a control circuit associated with one of said electric valve means and comprising means for producing a periodic voltage to render said electric valve means conductive at a predetermined time during positive half cycles of applied anode-cathode voltage, means responsive to the current conducted by said one electric valve means for rendering the other electric valve means conductive, means for initiating the operation of said control circuit, and timing means energized from said load circuit for controlling the operative period of said control circuit.

9. In combination, an alternating current circuit, a load circuit, electric translating apparatus connecting said circuits and comprising a pair of reversely connected electric valve means for transmitting energy between said circuits, each of said electric valve means being provided with a control member, a control circuit associated with one of said electric valve means and comprising means for producing a periodic voltage of peaked wave form to render said one electric valve means conductive at a predetermined time during positive half cycles of applied anode-cathode voltage, means responsive to the current conducted by said one electric valve means for rendering the other electric valve means conductive, manually operable means connected in said control circuit for initiating operation of said control circuit, and timing means energized from said load circuit for controlling the maximum operative period of said control circuit.

10. In combination, an alternating current circuit, a load circuit, electric translating apparatus connected between said circuits and comprising an electric valve means having a control member, a control circuit comprising means for impressing on said control member a periodic voltage to render said electric valve means conductive at a predetermined time during half cycles of voltage of said alternating current circuit, and a circuit responsive to the energization of said load circuit for rendering said control circuit inoperative after a predetermined number of half cycles of current have been transferred to said load circuit and comprising a capacitance, means for charging said capacitance from said load circuit and means for discharging said capacitance only after the voltage thereof attains a value indicative of said predetermined number of half cycles.

11. In combination, an alternating current circuit, a load circuit, electric translating apparatus connected between said circuits and comprising an electric valve means having a control member, a control circuit comprising means for impressing on said control member a periodic voltage to render said electric valve means conductive at a predetermined time during half cycles of voltage of said alternating current circuit, a capacitance, means for charging said capacitance from said load circuit, and means for discharging said capacitance only after the voltage thereof attains a value indicative of a predetermined number of half cycles of current transmitted to said load circuit to render said control circuit inoperative.

12. In combination, an alternating current circuit, a load circuit, electric translating apparatus connected between said circuits and comprising an electric valve means having a control member, a control circuit comprising means for impressing on said control member a periodic voltage to render said electric valve means conductive at a predetermined time during half cycles of voltage of said alternating current circuit, a capacitance, a rectifier for charging said capacitance from said load circuit, and an electric valve means for discharging said capacitance to render said control circuit inoperative when the voltage of said capacitance attains a value indicative of a predetermined number of half cycles of current transmitted to said load circuit.

13. In combination, an alternating current circuit, a load circuit, electric translating apparatus connected between said circuits and comprising an electric valve means having a control member, a control circuit comprising means for impressing on said control member a periodic voltage to render said electric valve means conductive at a predetermined time during half cycles of voltage of said alternating current circuit, a capacitance, a rectifier for charging said capacitance from said load circuit, an electric valve connected in circuit to effect discharge of said capacitance and having a control member for controlling the conductivity thereof, a voltage divider connected across said capacitance for impressing on the control member of the second electric valve a voltage to render the second electric valve conductive when the voltage of the capacitance attains a value indicative of a predetermined number of half cycles of current transmitted to said load circuit, and means responsive to the discharge of said capacitance for rendering the control circuit inoperative.

14. In combination, an alternating current circuit, a load circuit, electric translating apparatus connected between said circuits and comprising electric valve means for controlling the transfer of energy therebetween, said electric valve means including a control member for controlling the conductivity of the electric valve means, a control circuit comprising means for impressing on said control member a voltage to render said electric valve means conductive at a predetermined time during half cycles of voltage of said alternating current circuit to transmit a predetermined amount of energy to said load circuit, and means energized from said load circuit for controlling the operative period of said control circuit to compensate for variations in the magnitude of the voltage of said alternating current circuit.

15. In combination, an alternating current circuit, a load circuit, electric translating apparatus connected between said circuits and comprising a pair of reversely connected electric valve means for transmitting energy between said circuits, each of said electric valve means being provided with a control member for controlling the conductivity thereof, a control circuit for one of said electric valve means and being energized in accordance with the anode-cathode voltage of said one electric valve means and comprising means for connecting the associated control member to the anode of that electric valve, mean responsive to the current conducted by said one electric valve means for rendering the other electric valve means conductive, and means responsive to the energization of the load circuit for rendering said control circuit inoperative after transfer of a predetermined even number of half cycles of current to said load circuit.

16. In combination, an alternating current circuit, a load circuit, electric translating apparatus connected between said circuits and comprising a pair of reversely connected electric valve means for transmitting energy between said circuits, each of said electric valve means being provided with a control member for controlling the conductivity thereof, a control circuit connected between the anode and the cathode of one of said electric valve means for effecting energization of the associated control member, means responsive to the current conducted by said one electric valve means for rendering the other electric valve means conductive, and timing means for interrupting said control circuit after a predetermined interval of time to effect a single energization of said load circuit.

17. In combination, an alternating current circuit, a load circuit, electric translating apparatus connected between said circuits and comprising electric valve means reversely connected in parallel for transferring alternating current to said load circuit, said electric valve means including a control member for controlling the conductivity thereof, means for impressing a periodic voltage of peaked wave form on said control member to determine the time in each cycle of voltage of said supply circuit that said electric valve means is rendered conductive, means for controlling the effectiveness of said source of periodic voltage to determine the number of consecutive cycles of voltage of said supply circuit during which said valve means is rendered conductive comprising a circuit closer operable at random with respect to said alternating current supply circuit and a timing circuit initiated in operation as a result of said periodic voltage being rendered effective by operation of said circuit closer for rendering said periodic voltage ineffective after a predetermined interval.

WARREN C. HUTCHINS.